March 17, 1953     B. L. HENRY     2,631,408
EATING TOY ANIMAL
Filed Nov. 29, 1949
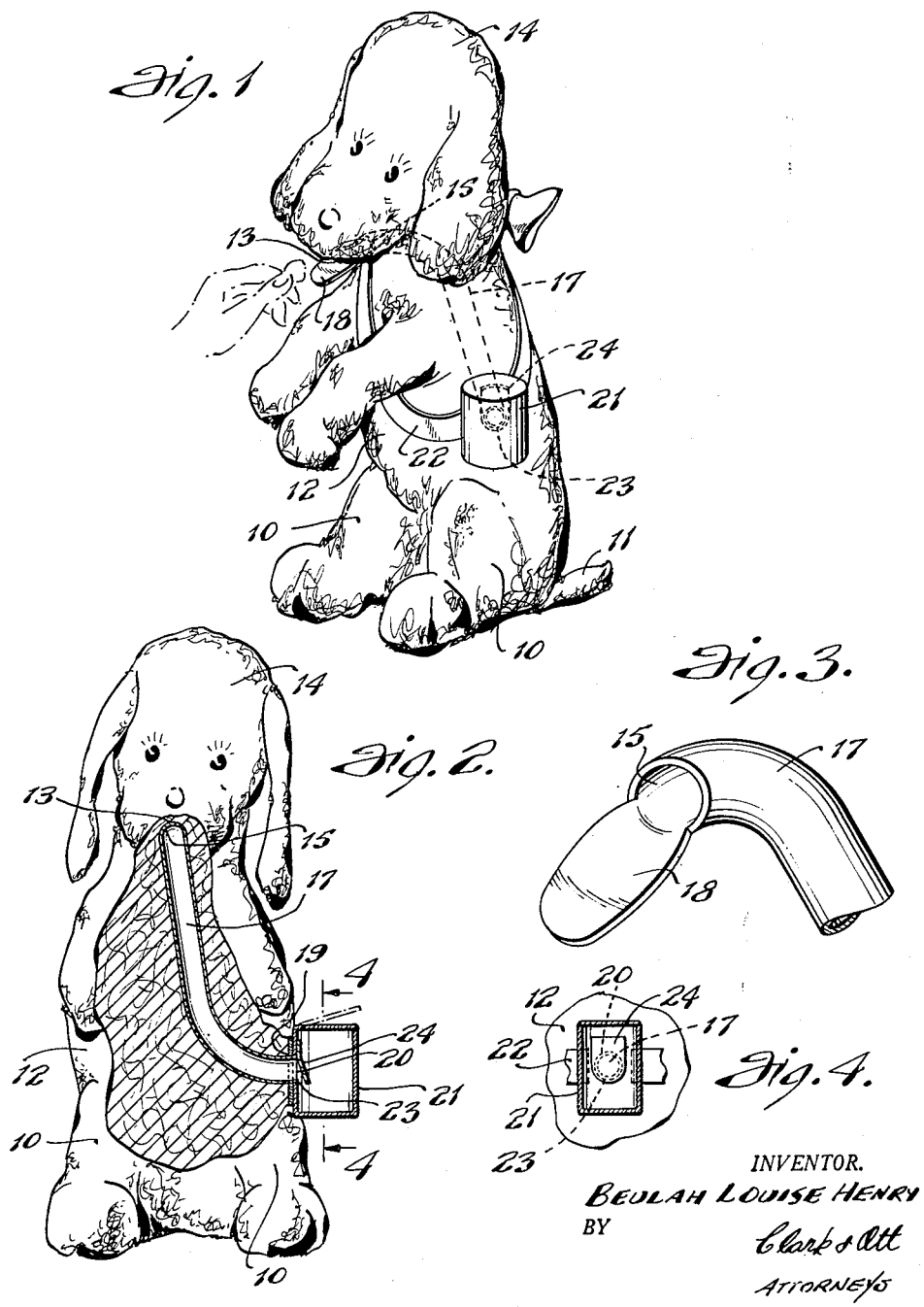
INVENTOR.
BEULAH LOUISE HENRY
BY
Clark & Ott
ATTORNEYS Patented Mar. 17, 1953

2,631,408

UNITED STATES PATENT OFFICE 2,631,408

EATING TOY ANIMAL

Beulah Louise Henry, New York, N. Y.

Application November 29, 1949, Serial No. 129,968

1 Claim. (Cl. 46—141)

This invention relates to a toy animal which is constructed and arranged to receive food through the mouth opening so as to simulate the normal function of eating of a live animal.

An object of the invention is to provide a toy animal which is adapted to be disposed in a seated position so as to assume the attitude of begging for food and which when so disposed can be fed with particles of food and the like through the mouth opening which particles will be discharged in a basket or receptacle strapped to the side of the animal.

Another object of the invention is to provide a toy animal which is attractive in appearance, which will provide amusement and entertainment for children and which is effective for its intended purpose.

With the foregoing and other objects in view, reference is now made to the following specification and accompanying drawings in which the preferred embodiment of the invention is illustrated.

In the drawings:

Fig. 1 is a view in elevation of a toy animal constructed in accordance with the invention.

Fig. 2 is a front view of the animal shown partly in section.

Fig. 3 is a perspective view of the tongue of the animal and a portion of the conduit connected therewith.

Fig. 4 is a vertical sectional view taken approximately on line 4—4 of Fig. 2.

Referring to the drawings by characters of reference, the invention is illustrated in its application to a toy dog which is constructed and arranged to sit upright so as to assume the attitude of begging for food. For this purpose the rear legs 10 are spaced apart and the tail 11 projects outwardly to permit of balancing the toy in upright relation as illustrated in Fig. 1 of the drawings.

The body 12 may be fashioned of any desired material which as illustrated is of stuffed formation having an opening 13 in the underside of the head 14 through which projects the open upper end 15 of a conduit 17. A tongue 18 is formed integrally with the conduit 17 so as to protrude from the opening 13 downwardly and outwardly from the open upper end 15. The tongue 18 is of concavo-convex formation so as to provide a recess in the upper face thereof for receiving particles of food and the like when the toy is disposed in a seated position.

From the opening 15 the conduit 17 extends downwardly within the body 12 with the lower end of the conduit protruding through an opening 19 in the side wall of the body and extending through an opening 20 in a side wall of a receptacle 21 secured to the body 12 of the toy by a strap 22 trained around the body and over the shoulder thereof. The lower open end 23 of the conduit 17 opens into the receptacle 21 so as to deposit any particles of food and the like in the receptacle. The receptacle is provided with a flap 24 which is secured thereto above the open lower end 23 of the conduit with the lower portion of the flap disposed in overlying relation with the open lower end 23 so as to hide the same yet permitting of the swinging of the flap to open relation for depositing the particles of food in the receptacle.

In use, the toy is disposed in a seated position and a small particle of food and the like is deposited on the tongue 18 adjacent the open upper end thereof and by slightly tilting the animal the food will descend through the conduit 17 and be discharged through the open lower end 23 thereof into the receptacle 21. The flap 24 hides the open lower end 23 of the conduit so that the particle of food and the like fed to the toy drops into the receptacle unobserved by striking the flap so as to swing the same to open relation.

What is claimed is:

In a toy animal, a body having a head provided with a mouth opening, a conduit arranged within the body of the animal with the upper end of the conduit protruding through the mouth opening, a tongue having a concave upper face in cross-section to provide a recess for receiving particles thereon, said tongue being formed as a continuation of said conduit and extending outwardly and downwardly from the protruding upper end thereof, said conduit having its lower open end protruding through the side of the body, a receptacle secured to the side of the body with the open lower end of the conduit opening into said receptacle for receiving particles deposited on said tongue and falling through said conduit, and a hinged flap arranged within said receptacle and normally closing the open end of said conduit.

BEULAH LOUISE HENRY.

REFERENCES CITED

The following references are of record in the file of this patent:

UNITED STATES PATENTS

| Number | Name | Date |
|---|---|---|
| 1,751,773 | Trosper | Mar. 25, 1930 |
| 2,196,912 | Gilbraith | Apr. 9, 1940 |
| 2,453,922 | Manaster | Nov. 16, 1948 |

FOREIGN PATENTS

| Number | Country | Date |
|---|---|---|
| 507,134 | Great Britain | June 9, 1939 |